United States Patent
Sokolov et al.

(10) Patent No.: US 9,841,906 B2
(45) Date of Patent: Dec. 12, 2017

(54) ZONE FORWARD DRIVE MANAGEMENT

(71) Applicant: Seagate Technology LLC, Cupertino, CA (US)

(72) Inventors: Daniel J. Sokolov, Boulder, CO (US); Adam J. Weikal, Butler, PA (US); Monish S. Prabhakar, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 103 days.

(21) Appl. No.: 15/012,526

(22) Filed: Feb. 1, 2016

(65) Prior Publication Data

US 2017/0220264 A1    Aug. 3, 2017

(51) Int. Cl.
| | | |
|---|---|---|
| G06F 12/00 | (2006.01) | |
| G06F 3/06 | (2006.01) | |
| G06F 12/10 | (2016.01) | |
| G11B 20/12 | (2006.01) | |

(52) U.S. Cl.
CPC .......... *G06F 3/0611* (2013.01); *G06F 3/064* (2013.01); *G06F 3/0659* (2013.01); *G06F 3/0676* (2013.01); *G06F 12/10* (2013.01); *G11B 20/1217* (2013.01); *G06F 2212/1024* (2013.01); *G06F 2212/21* (2013.01); *G06F 2212/70* (2013.01); *G11B 2020/1242* (2013.01); *G11B 2020/1298* (2013.01)

(58) Field of Classification Search
None
See application file for complete search history.

(56) References Cited

U.S. PATENT DOCUMENTS

| | | | |
|---|---|---|---|
| 6,922,754 B2 | 7/2005 | Liu et al. | |
| 7,996,645 B2 | 8/2011 | New et al. | |
| 2015/0339310 A1* | 11/2015 | Pursche | G06F 17/30011 707/726 |
| 2016/0224260 A1* | 8/2016 | Bandic | G06F 3/0619 |
| 2016/0283115 A1* | 9/2016 | Gaertner | G11C 7/1012 |
| 2016/0293207 A1* | 10/2016 | Fukuhisa | G11B 20/1217 |

OTHER PUBLICATIONS

Author Unknown, "DB2 Performance Tuning—DB2 and IO Performance," Lascon Storage, [retrieved Jun. 10, 2015] 3 pages. Retrieved from http://www.lascon.co.uk/DB2-performance.php.

\* cited by examiner

*Primary Examiner* — John A Lane
(74) *Attorney, Agent, or Firm* — Holzer Patel Drennan

(57) ABSTRACT

Various zone forwarding management techniques disclosed herein generally provide efficient methods of data caching, steering, mapping, and migration to reduce write amplification and command latency. In one implementation, a zone-forward storage medium management method includes receiving commands to write data sets to target LBAs included in a consecutive sequence of LBAs, selectively mapping the sequence of LBAs to a plurality of contiguous physical zones, and selectively writing the data sets to the physical zones. Various techniques may be used to migrate valid data of the plurality of physical zones to one physical zone.

20 Claims, 13 Drawing Sheets

ZONE FORWARD DRIVE MANAGEMENT

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR utilizes a write pole that generates a write field strong enough to affect two or more adjacent tracks at a time. To avoid data loss due to incidental track overwrites, data is managed in groups of tracks referred to as "data bands," which are separated from one another by isolation regions that do not store any data. SMR systems typically re-write a group of data tracks whenever one or more data cells within the group are changed. For example, updating a single cell in track may entail writing all or a portion of an associated data band into memory (e.g., a scratchpad), updating the single cell, and re-writing the data band or portion of the data band back to original locations on the storage media. This processing overhead contributes to read/write latencies and reduces drive performance.

SUMMARY

The disclosure herein includes methods and systems for zone forwarding drive management. In some embodiments, the present systems and methods may improve the reliability of data storage devices.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In some storage systems, modifying a small amount of data on a storage media entails a read and re-write of additional unmodified data. For example, Shingled Magnetic Recording (SMR) utilizes a writer sized to generate a magnetic field strong enough to affect magnetic polarity of two adjacent data tracks on a storage medium at once. Consequently, large amounts of unmodified data (also referred to herein as "complement data") may be read into memory and re-written to a same location, unchanged, whenever a small amount of data is changed on the medium. Likewise, other systems—such as Interlaced Magnetic Recording (IMR) systems—deliberately impose partial track overlaps to increase drive areal storage density or to improve device performance. These systems may also implement a variety of techniques for handling writes of complement data. Mitigating work amplification and resulting command latencies are on-going challenges in these types of storage systems.

In one implementation, the foregoing is addressed by a storage device controller that duplicatively maps host logical block addresses (LBAs) to multiple physical locations on a media. For example, a consecutive range of host logical block addresses (LBAs) may be simultaneously mapped to two or more contiguous physical storage regions on an overprovisioned storage drive. In this respect, an update to data may be performed by selectively updating data in one of the associated regions selected based on a degree of processing overhead associated with a prospective write operation. Although the examples discussed herein relate primarily to SMR drives and SMR systems, the disclosed technology may be useful in a variety of other types of storage systems including conventional drives, interlaced magnetic recording, etc.

Figure 1:
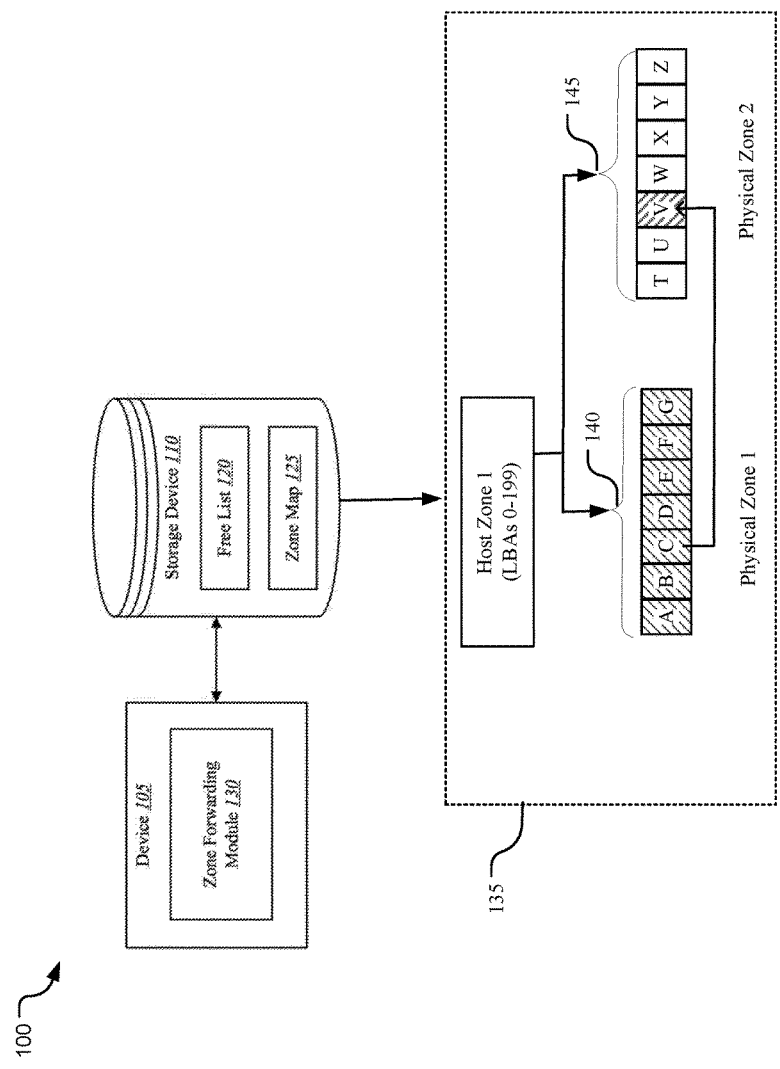
FIG. 1 is a block diagram illustrating an example zone forward drive management system.

FIG. 1 is a block diagram illustrating one example embodiment of an environment 100 in which the present systems and methods may be implemented. The example environment includes device 105 and storage device 110. The storage device 110 may include any combination of hard disk drives, solid state drives, and hybrid drives that include both hard disk and solid state drives. In one implementation, the storage device 110 includes a volatile cache (e.g., disk buffer, static random access memory (RAM), dynamic RAM, etc.), a main store (e.g., user data storage region), and a media cache, such as a non-volatile memory region that temporarily stores data newly written to the storage device 110 and/or data already stored at a first storage location of storage device 110 that is being transferred to a second storage location. In contrast to the main store, the media cache may include storage locations inaccessible to the user. For example, the media cache may be exclusively accessible to a processor of storage device 110 to perform the internal operations and functions of the storage device 110.

In some implementations of the disclosed technology, the storage device 110 executes writes of new data to the media cache, and the new data is subsequently moved to main store locations, such as during idle time of the storage device. In still other implementations, the storage device 110 uses various data mapping, migration, and steering techniques, collectively herein referred to as "forward zone management" to execute random and/or sequential writes of new data directly to the main store without writing the new data to the media cache.

In one implementation, the storage device 110 is a shingled magnetic recording (SMR) device. In shingled magnetic recording, an update to a target data track magnetically affects data bits of an adjacent data track. Thus, some SMR technologies utilize a media scratch pad (e.g., a reserved region of the media cache) to temporarily store complement data. For example, updating a data track in a SMR device may entail reading all or a portion of an associated data band into the media scratch pad, modifying the data to include new data, and writing the new data along with the unmodified read data (e.g., the complement data) back to original storage locations.

The disclosed technology provides solutions that eliminate usage of a media scratch pad during write operations in SMR devices and potentially other types of storage devices as well. In lieu of a media scratch pad, the storage device 110 uses various forward-zone management techniques to preserve data and to increase storage device efficiency.

In some embodiments, the systems and methods described herein may be performed on a single device (e.g., device 105). In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, etc. The device 105 is communicatively coupled to the storage device 110, and in some implementations, may be internal to the storage device 100.

The storage device 110 includes or is communicatively coupled to a zone-forwarding module 130 that manages a free list 120 and a zone map 125. The free list 120 includes a list of available and/or unavailable physical zones on a storage medium of the storage device. In one implementation, each physical zone is a contiguous physical region of the main store that can be updated without changing data elsewhere on the storage medium outside of the physical zone. For example, each physical zone may be set to a predetermined size (e.g., 256 MB per zone), and may include several tracks. The zone map 125 indicates a mapping between host zones and one or more corresponding physical zones. For example, each host zone may include a consecutive sequence of LBAs that is mapped statically or dynamically, via the zone map 125, to at least one of the physical zones. If a physical zone contains no valid data, then the physical zone may be listed as available in the free list 120. If a physical zone contains data, then the zone may be listed as unavailable in the free list 120.

In one implementation where the storage device 110 is an SMR device, the physical zones in the zone map 125 are shingled data bands. In other implementations, the physical zones assume other granularities. In operation, the storage device 110 receives access commands (e.g., read and write commands) from a host (not shown) along with one or more logical block addresses (LBAs) identifying requested read and write locations on a storage media. The zone forwarding module 130 manages the zone map 125 to implement a mapping scheme, such as that illustrated by an example partial map 135 in FIG. 1. In some systems, an LBA to physical block address (PBA) mapping scheme is provided by a one-to-one correlation. However, the presently-disclosed technology also allows for an LBA or a range of LBAs to be concurrently mapped to two or more PBAs.

For example, an example partial map 135 illustrates a mapping of logical zone to two physical zones. An example host zone (e.g., Host Zone 1) is shown to include a range of consecutive LBAs (e.g., 0-199) which are mapped, by an LBA-to-PBA mapping scheme of the storage device 110, to both a first series of consecutive data tracks 140 (e.g., Physical Zone 1, denoted A-G) on a storage medium and also to a second series of consecutive data tracks 145 (e.g., Physical Zone 2, denoted T-Z).

In one implementation, the mapping shown in the partial map 135 occurs responsive to a determination that a requested data write poses a threat of overwrite or corruption to valid data unmodified by the data write. For example, the zone forwarding module 130 may initially write data of Host Zone 1 to data tracks A-G of the first series of consecutive data tracks 140 and subsequently receive a command to update data currently stored at the data track denoted "C." In some data storage systems (e.g., SMR, IMR, etc.), a write to a data track on the storage device 110 affects two or more adjacent tracks at once. Therefore, the storage device 110 may not be able to write data to track C without overwriting data in track D. The partial map 135 illustrates one of multiple potential solutions that the data storage device 110 may implement in such case.

To create the partial map 135, the storage device 110 accesses the free list 120, identifies that the second range of consecutive tracks 145 are available, and duplicatively maps LBAs of Host Zone 1 (0-199) to the second series of consecutive data tracks 145. After this mapping, the storage device controller writes the new data originally directed to Track C of the first series of consecutive tracks 140 to Track V of the second series of consecutive tracks 145 instead. Consequently, the first series of consecutive tracks 140 stores invalid (old) data on Track C and the second series of consecutive tracks 145 stores a valid (current) version of the data on Track V.

At a later point in time, such as during idle time of the storage device 110, data can be migrated between physical zones to cause all valid data of Host Zone 1 to be stored in one physical zone. Example data migration techniques are discussed in detail with respect to at least FIGS. 3A, 3B, and 4, below. When selectively implemented, these and other zone-forwarding techniques can improve device performance, such as by reducing observed write latencies and reducing or eliminating time allocated for "cleaning" the media cache, wherein media cache data is transferred to corresponding main store locations.

Figure 2:
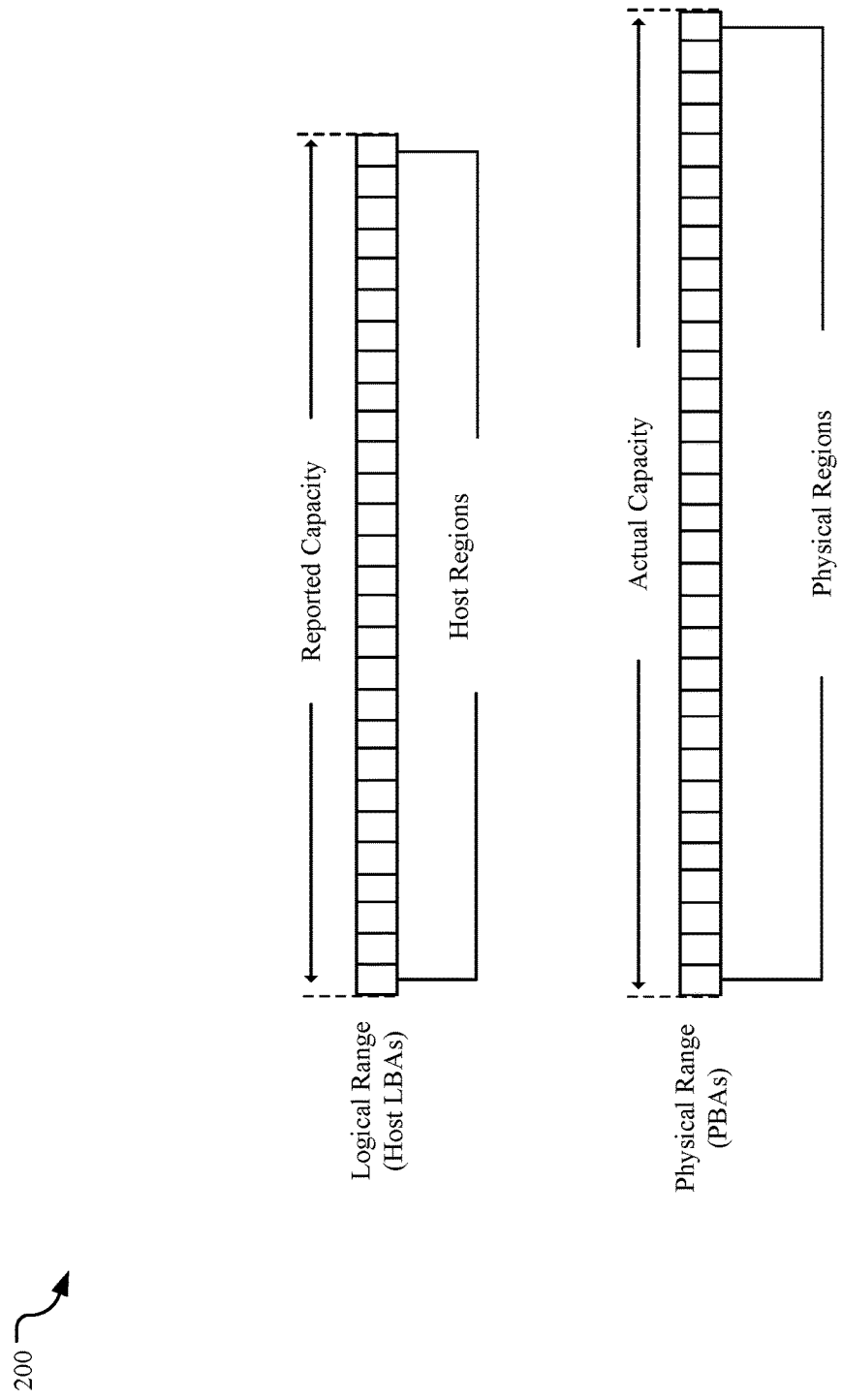
FIG. 2 illustrates an example overprovisioned storage device suitable for implementing a zone forward drive management system.

FIG. 2 illustrates an example overprovisioned storage device suitable for implementing the disclosed technology. A host (not shown) reads and writes data to the storage device 200 using a range of logical block addresses (LBAs) to identify corresponding physical data blocks (e.g., sectors) on a storage medium. However, a reported capacity (e.g., as measured by the range of host LBAs) is less than an actual usable capacity. That is, there exist a greater number of usable physical data blocks than there are logical block addresses describing the corresponding physical addresses. This mismatch between reported capacity and actual capacity allows for some of the LBAs to be mapped to two or more physical data blocks on the storage medium at once, at least for temporary periods of time.

In one example implementation, the storage device 200 is a shingled magnetic recording device. Due to overprovisioning of the storage device 200, a storage device controller statically or dynamically maps some LBAs to two or more shingled data bands. For example, a data band identifiable by LBAs 100-200 may be simultaneously mapped to two physical data bands—a "source data band" and a "destination data band." When data of the source data band is updated, the storage device may selectively forward (e.g., migrate) valid data from the source data band to the destination data band. This result is explored in greater detail below with respect to the following figures.

Figure 3A:
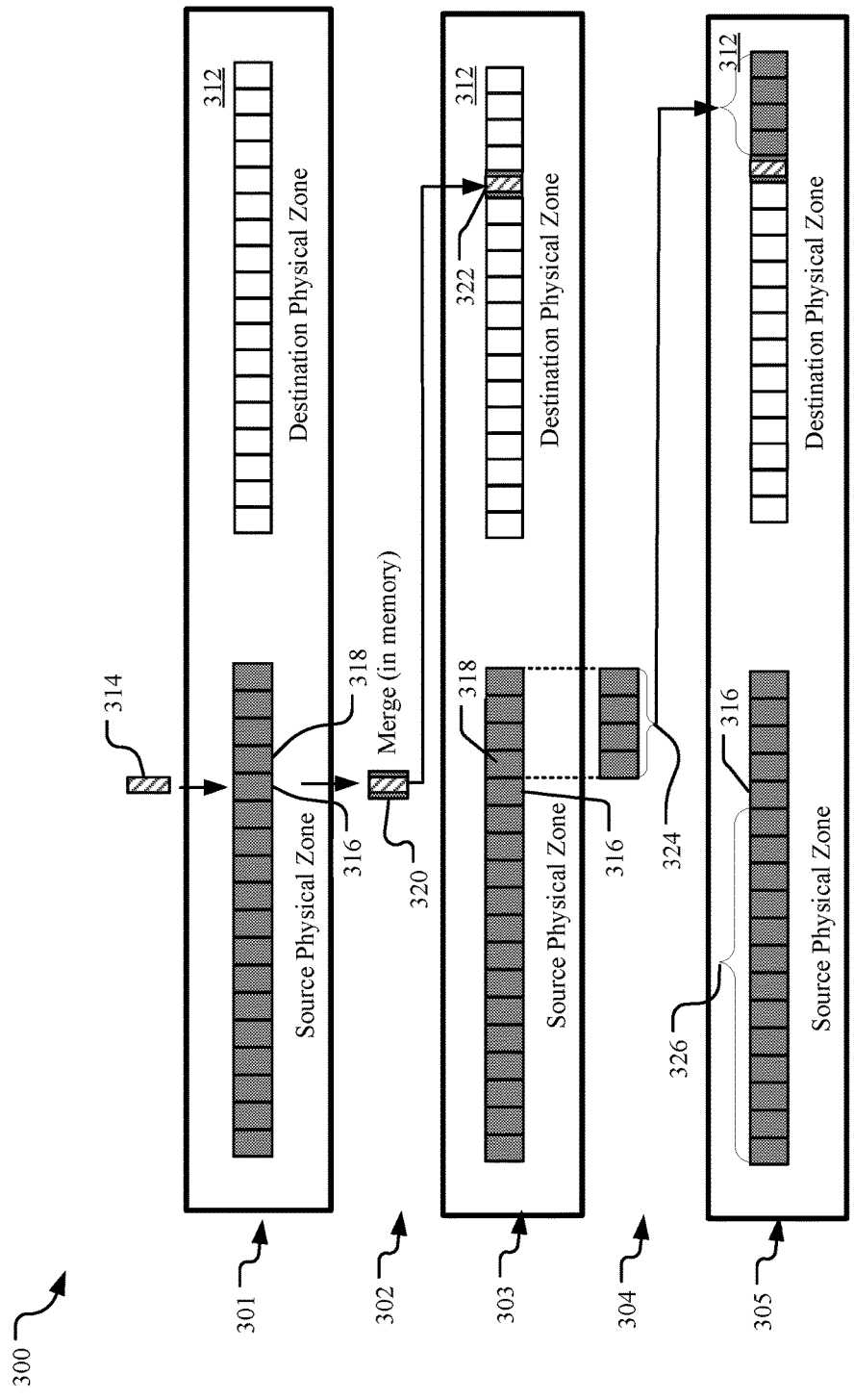
FIG. 3A illustrates an example data management system implementing zone-forward drive management techniques.

FIG. 3A illustrates example data management system 300 implementing zone-forward drive management techniques. The data management system 300 includes a storage medium 312 with storage spaced divided into a number of physical zones. Each physical zone is a contiguous region of physical storage space. In the example of FIG. 3A, the data management system 300 implements shingled magnetic recording, and each physical zone is a band of shingled magnetic data tracks separated from other physical zones (e.g., shingled bands) by one or more guard tracks where no data is stored. For example, each physical zone on the storage medium 312 may includes 20 consecutive data tracks. In other implementations, the physical zones may take on forms other than bands of shingled data tracks (e.g., groupings of non-shingled data tracks, groupings of sectors within a track, etc.)

A host (not shown) identifies read and write regions of the data management system 300 by a logical block addressing (LBA) scheme. In one implementation, each LBA corresponds to a physical block address (PBA) on the storage medium 312, either according to a static mapping scheme or a dynamically determined mapping scheme. In one implementation, consecutive sequences of LBAs are divided into logical subsets referred to as "host zones," and each host zone is mapped to at least one corresponding physical zone. The host zones and logical zones may be identical in size (e.g., a ratio of LBAs to PBAs in each is 1:1) or different in size (e.g., physical zones are smaller than host zones or vice versa). Thus, there may exist implementations wherein a single host zone is mapped to two or more different physical zones but the mapping is not "duplicative" because each host LBA is mapped to exactly one corresponding PBA. In the same or other implementations, a host zone may be duplicatively mapped—at least temporarily—to two or more physical zones. As used herein, a host zone is "duplicatively mapped" when it includes at least one LBA that is simultaneously mapped to two or more different PBAs. One example of duplicative mapping is described below.

During a receiving operation 301, the data management system 300 receives a request to write new data 314 to a storage medium 312. The new data 314 is addressed to a target LBA identified as belonging to a particular host zone (hereinafter "the Host Zone"). The target LBA further corresponds, via an LBA-to-PBA mapping scheme, to a target data track 316 in a particular physical zone (hereinafter "the Source Physical Zone"). For example, the Host Zone may include LBAs 100-149, which are mapped to PBAs of the Source Physical Zone The data management system 300 determines whether writing the new data 314 to the target data track 316 is likely to affect (e.g., corrupt or overwrite) data not updated by the data write, such as data in data tracks adjacent to the target data track. When, for example, an adjacent shingled data track 318 stores data (as indicated by shading in FIG. 3A), then the data management system 300 takes a zone-forwarding action to mitigate processing overhead related to preservation of such data. Specifically, the data management system 300 identifies another available (e.g., empty) physical zone—a "Destination Physical Zone"—and duplicatively maps the LBA's of the Host Zone to PBAs of Destination Physical Zone. If, for example, the Source Physical Zone includes PBAs mapped to LBAs 0-149 (in a one-to-one LBA to PBA mapping), the Destination Physical Zone also includes PBAs mapped to LBAs 0-149.

The following pseudocode exemplifies this mapping:
HostZone[1].SourcePhysicalZone=0
HostZone[1].DestPhysicalZone=2
where HostZone[1] is a range of LBAs (e.g., 0-149); '0' is a range of consecutive PBAs (e.g., 0-149); and '2' is another range of consecutive PBAs (e.g., 400-549).

During a merging operation 302, the data management system 300 reads the data track 316 into memory (e.g., volatile memory) and merges the new data 314 with the previously-recorded data of the target data track 316, per the LBA to PBA mapping scheme. This creates an an updated version 320 of data previously on the target data track 316. In a writing operation 303, the data management system 300 writes the updated version 320 of the target data track 316 to a target data track 322 in the Destination Physical Zone. In the example of FIG. 3, the target data track 322 occupies an index within the Destination Physical Zone identical to an index of the target data track 316 in the Source Physical Zone. For example, both the target data track 316 and the target data track 322 are the fourteeth tracks in the associated physical zones. However, in other implementations, the corresponding data tracks 316 and 322 do not assume identical physical indexing positions in the different physical zones. This is because, for example, different data tracks on a storage medium may include different numbers of sectors, so a data track in one physical zone may not map cleanly to a single track in another physical zone.

At this point in time, the data management system 300 may begin to execute other pending access commands, such as those related to areas of the storage medium 312 not included in the Source Physical Zone or the Destination Physical Zone. While mapped to both the Source Physical Zone and Destination Physical Zone, the Host Zone is considered an "in-process" region because it has some valid data in the Source Physical Zone (e.g., the entire associated band except for the target data track 316) and some valid data in the Destination Physical Zone (e.g., the target data track 322). In time, the in-process Host Zone may be "completed" by migrating all corresponding valid data to a common physical zone. However, by leaving the Host Zone temporarily "in-process," write delays can be mitigated as compared to other existing solutions.

Eventually, the data management system 300 takes action to complete the in-process Host Zone. During piece-wise migration steps 304 and 305, the data management system 300 reads into memory data of a subset of consecutive data tracks 324 following the target data track 316 in the Source Physical Zone. The data management system 300 writes this data to corresponding mapped locations in the Destination Physical Zone, as shown. Notably, the subset of consecutive data tracks 324 are written in a consecutive write order identical to a write order of an implemented shingled magnetic recording scheme. Consequently, no valid data is corrupted or lost by the piece-wise migration steps 304 and 305. As a result, the Destination Physical Zone now includes all valid data of the associated Host Zone except for the data corresponding to LBAs mapped to a subset of consecutive tracks 326 at the beginning of the Destination Physical Zone.

Although FIG. 3A illustrates the subset of consecutive tracks 324 written to the Destination Physical Zone in a single write operation, the subset of consecutive data tracks 324 may, in some implementations, be migrated to the Destination Physical Zone in two or more separate write operations. These separate write operations may be performed all at once or at separate points in time, such as minutes, hours, or even days apart from one another. For example, the data in the shingled band following the target data track 316 may be moved to the Destination Physical Zone piece-wise, by writing subsets of data tracks according to a consecutive track order and/or by ordering the writes of the subsets so that the subsets are themselves written according to the consecutive track order. Additional completion steps 306, 307, and 308 are discussed below with respect to FIG. 3B.

Figure 3B:
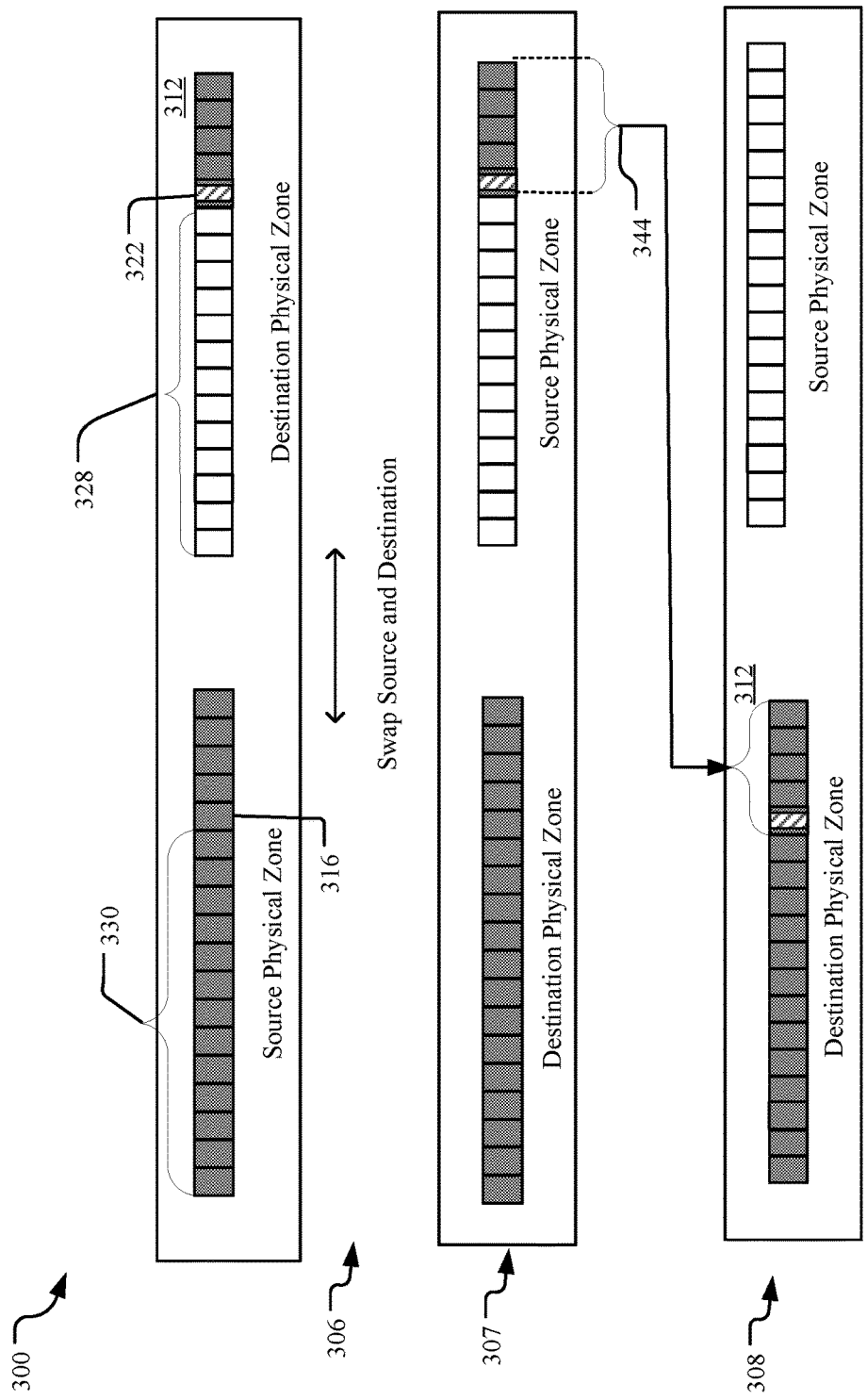
FIG. 3B illustrates the example data management system of FIG. 3A implementing additional zone-forward drive management techniques.

FIG. 3B illustrates the data management system 300 of FIG. 3A implementing additional forward-zone drive management techniques to complete the Host Zone. Prior to completion steps 306-308, the Destination Physical Zone includes valid data in a series of data tracks following a target data track 322 on the storage medium 312 in a direction defined by a consecutive write order of the storage device; however, a subset 328 of data tracks preceding the target data track 322 are blank. The Source Physical Zone, in comparison, includes valid data in all data tracks except for the target data track 316, which stores an older version of valid data now stored in the target data track 322 of the Destination Physical Zone.

To complete the in-process Host Zone, the data management system 300 assesses a most efficient way to combine the valid data from the Source Physical Zone and the Destination Physical Zone for storage in a single physical zone. For example, the data management system 300 determines that valid data of a first subset 330 of tracks of the Source Physical zone may not be directly moved the subset 328 of tracks in the Destination Physical Zone without overwriting data on the shingled data track 322.

Consequently, the data management system 300 identifies and implements a solution that entails swapping the Source Physical Zone and Destination Physical Zone and executing one final write operation. If, for example, the Source Physical Zone previously represented a range of PBAs, this range of PBAs is now designated as the Destination Physical Zone and PBAs previously represented by the Destination Physical Zone are now designated as the Source Physical Zone. This is done, in effect, to allow for a read 307 and write 308 of valid data (e.g., represented as a consecutive grouping of blocks 344) to the Destination Physical Zone (the original "Source Physical Zone"), thereby completing the Destination Physical Zone without performing any individual write operation that triggers usage of a media scratch pad or additional processing related to preservation of complement data affected by the write command.

After the data read 307 and the data write 308, the Destination Physical Zone is complete, and the Source Physical Zone can be freed (e.g., unmapped from the Host Zone) and made available for provisioning to other host zones for future read and write operations.

Notably, the merge operation 302 (discussed with respect to FIG. 3A) is beneficial in implementations that impose track-based parity. In some implementations that do not utilize track-based parity, the merge operation 302 is not performed. For example, the new data 314 is written directly to the Destination Physical Zone without first being merged with any unmodified data of the target data track 316.

The forward-zone management technique described in FIGS. 3A and 3B provide for forward migration of valid data from one physical zone to another and back again to an original physical zone (via the swap operation 306, read operation 307, and write operation 308). Thus, data is migrated bidirectionally. This type of forward management technique is also referred to herein as an "in-place" re-write operation. An in-place re-write operation entails a lesser amount of processing overhead in write instances when the new data 314 is directed to a data track near the end of the Source Physical Zone. Accordingly, this technique is, in one implementation, selectively implemented when the new data 314 is directed to a target data track in a second half of data tracks of the Source Physical Zone.

If a host device requests a data write at a location near a start of a physical zone, the data management system 300 may elect to implement the technique described below with respect to FIG. 4. This technique is referred to as a "copy-forward" re-write technique because it entails a mere "copy-forward" of data from one physical zone to another.

Figure 4:
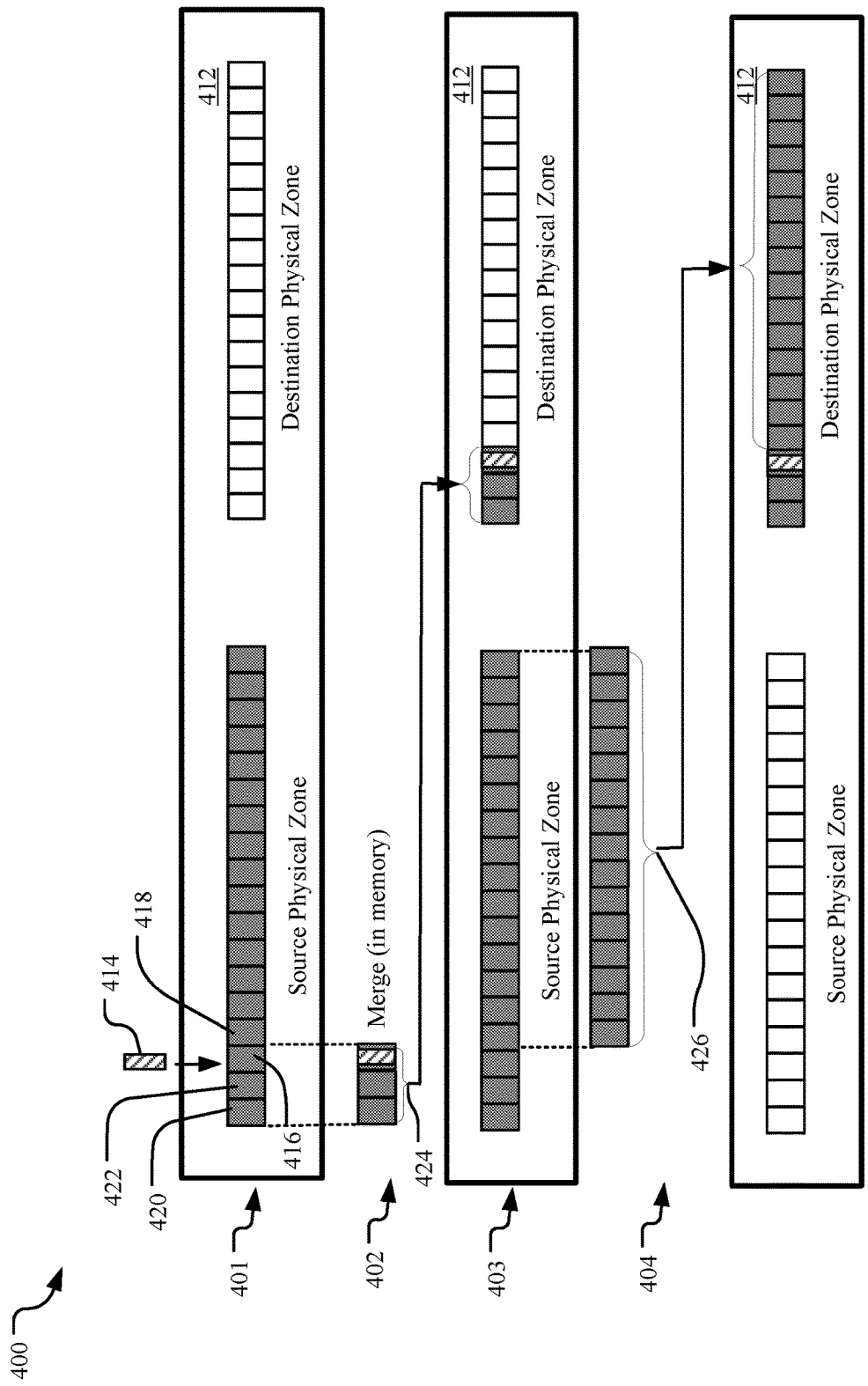
FIG. 4 illustrates another example data management system that implements zone-forward drive management techniques.

FIG. 4 illustrates another example data management system 400 that implements zone-forward drive management techniques. Although the disclosed techniques may be useful in a variety of types of systems, the data management system 400 is (in the following example) a shingled magnetic recording system. During a receiving operation 401, the data management system 400 receives a request to write new data 414 to a storage medium 412. The new data 414 is addressed to a target LBA included in a consecutive sequence of LBAs collectively referred to as a "Host Zone." In one implementation, the data management system 400 identifies and manages a mapping of a number of host zones and physical zones included physical storage space. In FIG. 4, the target LBA corresponds to a target data track 416 in a particular shingled data band (e.g., the "Source Physical Zone").

The data management system 400 determines whether writing the new data 414 to the target data track 416 has the potential to affect data in any adjacent data tracks not updated by the write operation. In the illustrated example, the data management system 400 determines that execution of a write to the target data track 416 causes data in an adjacent data track 418 to be overwritten. Accordingly, the data management system decides to begin taking steps to forward data of the Source Physical Zone to another physical zone.

In particular, the data management system 400 identifies another available (e.g., empty) shingled data band—a "Destination Physical Zone"—and maps the PBAs of Destination Physical Zone to a same consecutive sequence of LBAs as the Source Physical Zone. In an example merging operation 402, the data management system 400 reads into memory both the target data track 416 and any data tracks preceding the target data track 416 in the Source Physical Zone. For example, data tracks 420, 422, and 416 are read into memory, in order, and the new data 414 is merged with the read data, creating a merged data portion 424, as shown.

In a writing operation 403, the data management system 400 writes the merged data portion 424 to the first three data tracks of the Destination Physical Zone. At this point in time, the data management system 400 may begin to execute other pending access commands, such as those related to areas of the storage medium 412 unassociated with the Source Physical Zone or the Destination Physical Zone.

While the Host Zone is duplicatively mapped to both the Source Physical Zone and the Destination Physical Zone, the Host Zone is considered an "in-process" logical zone. In time, the Host Zone may be "completed" by migrating all remaining valid data to a common physical zone. Although this migration may be completed by a series of write operations at any granularity elected by the data management system 400, this migration is performed via a single write operation 404 that migrates data of a grouping of tracks 426 (e.g., all tracks following the target data track 416 in a sequential write order) over to the Destination Physical Zone. Since the grouping of data tracks 426 are re-written according to a consecutive write order of the data management system 400 (e.g., left to right, as shown) this data write can be completed in a single, continuous write operation without having to read and re-write any complement data to a same storage location.

After the write operation 404, the Source Physical Zone is "free" from association with the Host Zone and made available as a destination physical zone for other host zones in future write operations. This "copy-forward" re-write technique reduces processing overhead as compared to other available options in certain situations, such as when the new data 414 is in near the beginning of the Source Physical Zone (e.g., within the first half of the Source Physical Zone).

Figure 5:
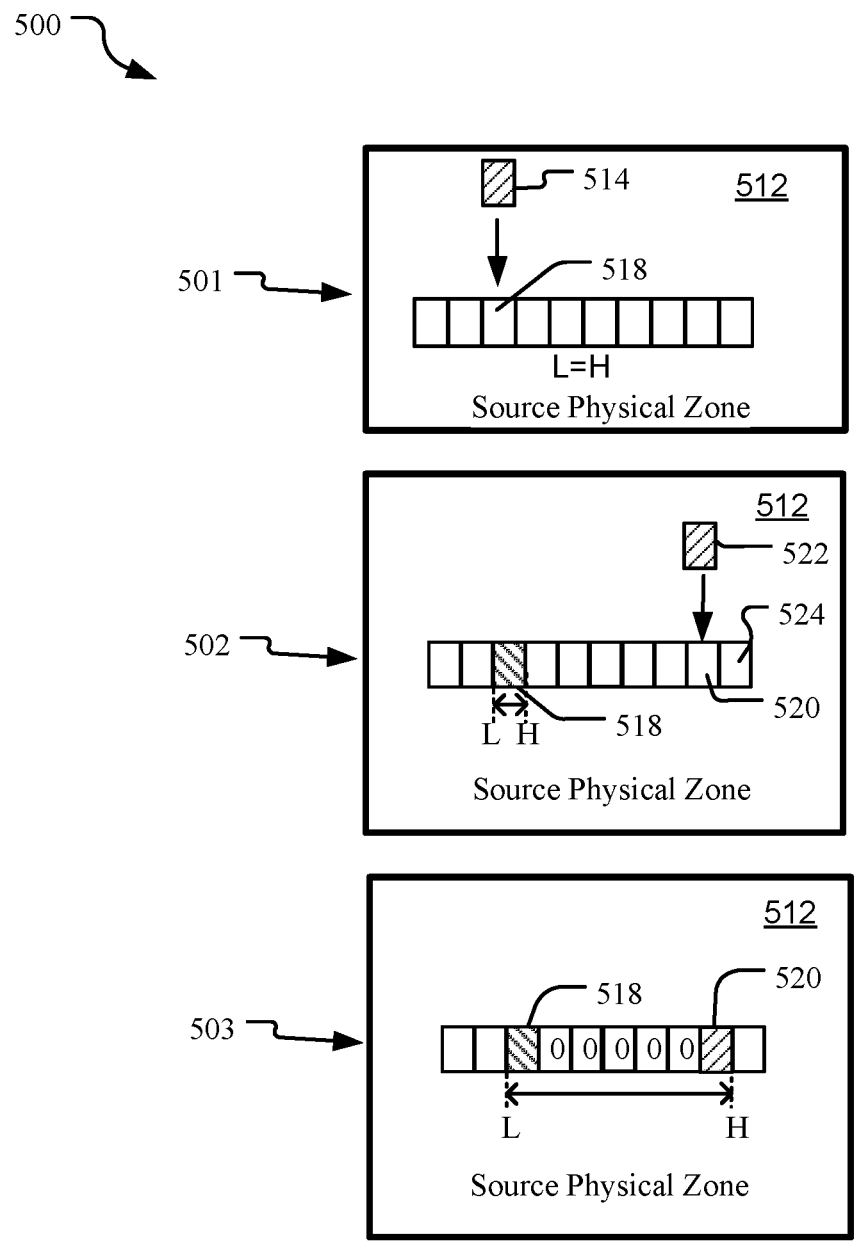
FIG. 5 illustrates yet another data management system implementing an example zone-forwarding technique for writing to non-consecutive tracks in a physical zone.

FIG. 5 illustrates a data management system 500 implementing an example zone-forwarding technique for writing to non-consecutive tracks in a physical zone (e.g., a Source Physical Zone) of a storage medium 512. In one implementation, the data management system 500 saves and manages a "high LBA" (H) and a "low LBA" (L) as metadata in association with each physical zone of the storage media. For example, corresponding L/H marks indicate a range of valid data within a particular physical zone. In FIG. 5, the Source Physical Zone does not initially include any valid data, and a low LBA mark is initially set to equal a high LBA mark.

At a receiving operation 501, the data management system 500 receives a request to write new data 514 to LBAs mapped to a data track 518 in the Source Physical Zone. After the data 514 is written to the data track 518, the data management system 500 updates the L/H marks accordingly (as shown below with respect to a receiving operation 502).

At the receiving operation 502, the data management system 500 receives a request to write additional data 522 to LBAs mapped to a data track 520 in the Source Physical Zone. The data management system 500 determines that no adjacent track data is potentially affected by the requested data write because there is no data stored in the adjacent data track 524. Based on this determination, the data management system 500 further determines that it has the option of writing the data 522 to the Source Physical Zone rather than to another available physical zone (e.g., as in the above examples of FIGS. 3A, 3B, and 4). At this point in time, the data management system 500 may implement additional logic to determine whether it is more efficient to write the data 522 to the Source Physical Zone or another available physical zone. For example, the data management system may consider how many data tracks and/or data blocks exist between the tracks 518 and 520 on the storage medium 512.

In the illustrated example, each physical zone is limited to one high mark (H) and one low mark (L). Therefore, the data management system 500 zero-fills placeholder bits in any data blocks falling within a corresponding L/H range that do not store valid data. This zero-filling technique may assist in tracking duplicatively mapped data sets and/or also enable parity checks at a particular granularity (e.g., track-based granularity). If, for example, the data tracks 518 and 520 are fairly close together, it may be more efficient to zero-fill the interim tracks (as indicated by '0s' in FIG. 5) than to duplicitively map LBAs of the Source Physical Zone to another physical zone and subsequently implement steps to complete in progress physical zones (e.g., as in the in-place rewrite of FIGS. 3A and 3B and the copy-forward re-write of FIG. 4).

Thus, at a write operation 503, the data management system 500 performs a sequential write that zero-fills any data blocks between the valid data in the data tracks 518 and 520 and also write the new data 522 to the data track 520, as shown. In other implementations (e.g., as explored with respect to FIG. 6), the data storage device may elect to duplicatively map the LBAs of the Source Physical Zone to another physical zone and write the new data 522 to the other physical zone.

Figure 6:
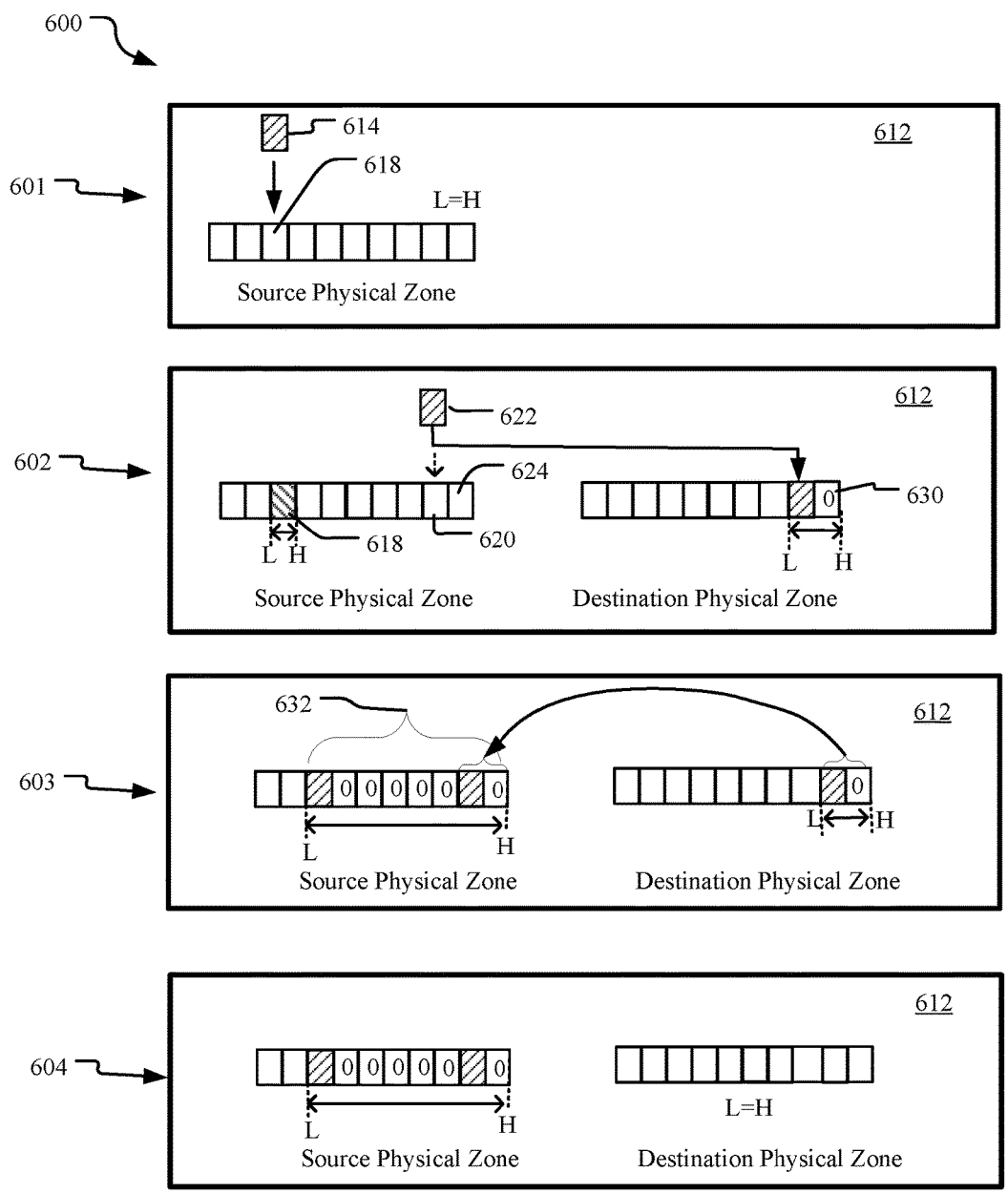
FIG. 6 illustrates another data management system performing yet another example zone-forwarding technique for writing to non-consecutive tracks in a physical zone.

FIG. 6 illustrates another data management system 600 performing example operations for writing data to non-consecutive tracks in a physical zone (e.g., a Source Physical Zone) of a storage medium 612. In FIG. 6, the data management system 600 tracks valid data using a high LBA mark (H) and a low LBA mark (L) as metadata in association with each physical zone of the storage media, as explained above with respect to FIG. 5. Initially, the Source Physical Zone does not include any data, and a low LBA mark is set to equal a high LBA mark. In other implementations, two or more H/L marks pairs are used to track storage locations of valid data within each physical zone.

At a receiving operation 601, the data management system 600 receives a request to write new data 614 to LBAs mapped to a data track 618 in the Source Physical Zone. After the new data 614 is written to the data track 618, the data management system 600 updates the L/H marks of the Source Physical Zone to indicate start and end LBAs of the new data 614.

At a receiving operation 602, the data management system 600 receives a request to write additional data 622 of LBAs mapped to a data track 620 in the Source Physical Zone. The data management system 600 determines that no adjacent track data is potentially affected by the data write because the adjacent data track 624 does not store any data. Based on this determination, the data management system 600 further determines that the option exists to write the data 622 to the Source Physical Zone rather than to another available physical zone. At this point in time, the data management system 600 may implement additional logic to determine whether it is more efficient to write the data 622 to the Source Physical Zone or another available physical zone. For example, the data management system may consider how far apart the data tracks 618 and 620 are from one another. If, for example, there are a lot of data tracks between the data tracks 618 and 620, it may be more efficient up-front or overall to duplicatively map LBAs of the Source Physical Zone to another physical zone and subsequently implement steps to complete the physical zone than to zero-fill the interim tracks, as described with respect to FIG. 5.

In the example of FIG. 6, the data management system 600 elects to duplicatively map LBAs of the Source Physical Zone to a new physical zone (a Destination Physical Zone) and write the new data 622 to a corresponding data track in the Destination Physical Zone, as indicated by a write operation 602. The data management system 600 also optionally zero-fills a last data track 630 of the Destination Physical Zone, and updates L/H marks of the Destination Physical Zone, as shown.

At a data write operation 603, the data management system 600 takes steps to finish the Destination Physical Zone by migrating valid data of the Destination Physical Zone to corresponding data tracks of the Source Physical Zone. In one implementation, the data write 603 is performed by reading into memory the valid data in the L/H ranges of both the Source Physical Zone and the Destination Physical Zone and zero-filling placeholder bits for LBAs falling consecutively between the L/H ranges of the Source Physical Zone and the Destination Physical Zone to generate a merged subset 632. This merged subset 632 is then written back to the Source Physical Zone as a sequential write (e.g., left to right) and corresponding L/H marks are updated, as shown.

In 604, the zone-forwarding module un-maps the Destination Physical Zone from the LBAs of the Source Physical Zone, thereby completing the Source Physical Zone and releasing the Destination Physical Zone for other zone-forwarding instances. The L/H marks may be set to equal one another once again, as shown.

In some implementations, a single host zone may be simultaneously associated with valid data in three or more physical zones on the storage medium 612. The data management system 600 may employ various logic to select an order for completing in-process zones. For example, all completion activities may be performed in idle time of the storage device and according to an "easiest first" prioritization rule. For example, the zones requiring the smallest amount of data migrations for completion may be completed first.

Figure 7:
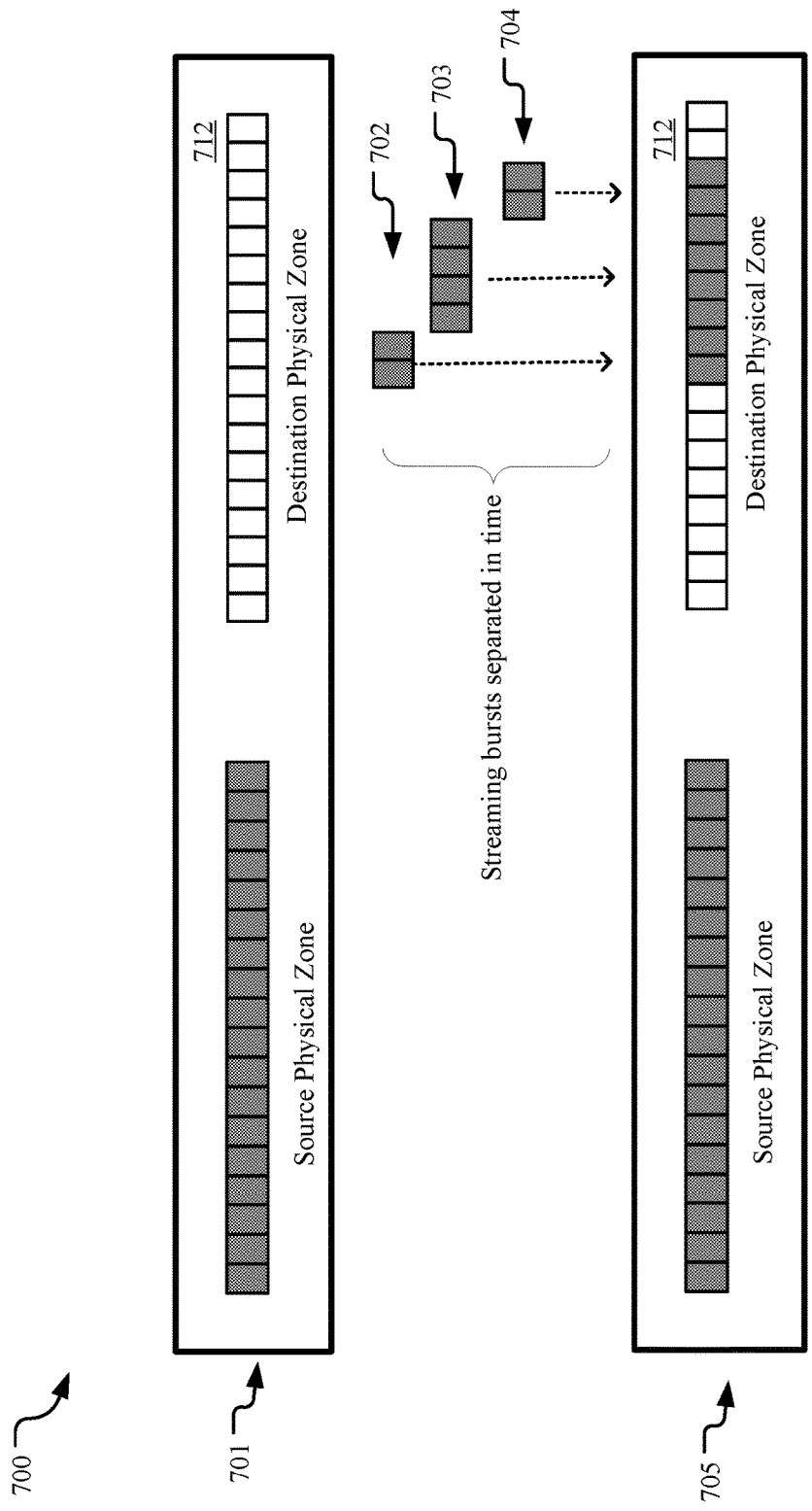
FIG. 7 illustrates a data management system implementing an example zone-forwarding technique for sequential write handling.

FIG. 7 illustrates a data management system 700 implementing an example zone-forwarding technique for sequential write handling. The data management system 700 includes a storage medium 712 with storage spaced divided into a number of physical zones. Two example physical zones are shown in FIG. 7—a Source Physical Zone and a Destination Physical Zone. In one implementation, the data management system 700 is a shingled magnetic recording system and the source Physical Zone and Destination Physical Zone are bands of shingled data tracks.

A controller of the storage device (not shown) manages a mapping of various host logical zones (e.g., groupings of consecutive LBAs) to physical zones on the storage medium 712. In the example of FIG. 7, data of a consecutive series of host LBAs is stored within the Source Physical Zone when the storage device controller receives (e.g., at 701) a series of commands requesting data writes of segments 702, 703, and 704 targeting sequential LBAs within a middle region of the Source Physical Zone.

The data management system 700 determines that it may not update any central data tracks of the Source Physical Zone without corrupting some data that is not modified by the write operation. Consequently, the data management system 700 identifies another available (e.g., empty) physical zone—the "Destination Physical Zone"—and duplicatively maps the LBAs corresponding to the Source Physical Zone to PBAs of the Destination Physical Zone. Since commands to write the data segments 702, 703, and 704 arrive in a consecutive write order, the data storage device can write the sequential writes directly to the Destination Physical Zone, as shown by a write operation 705. To complete the in-process host zone that is duplicatively mapped to both the Source Physical Zone and the Destination Physical zone, the data management system 700 may, for example, use the in-place re-write technique discussed with respect to FIGS. 3A and 3B. For example, the Source Physical Zone may become the Destination Physical Zone and receive the valid data of the Destination Physical Zone.

Figure 8:
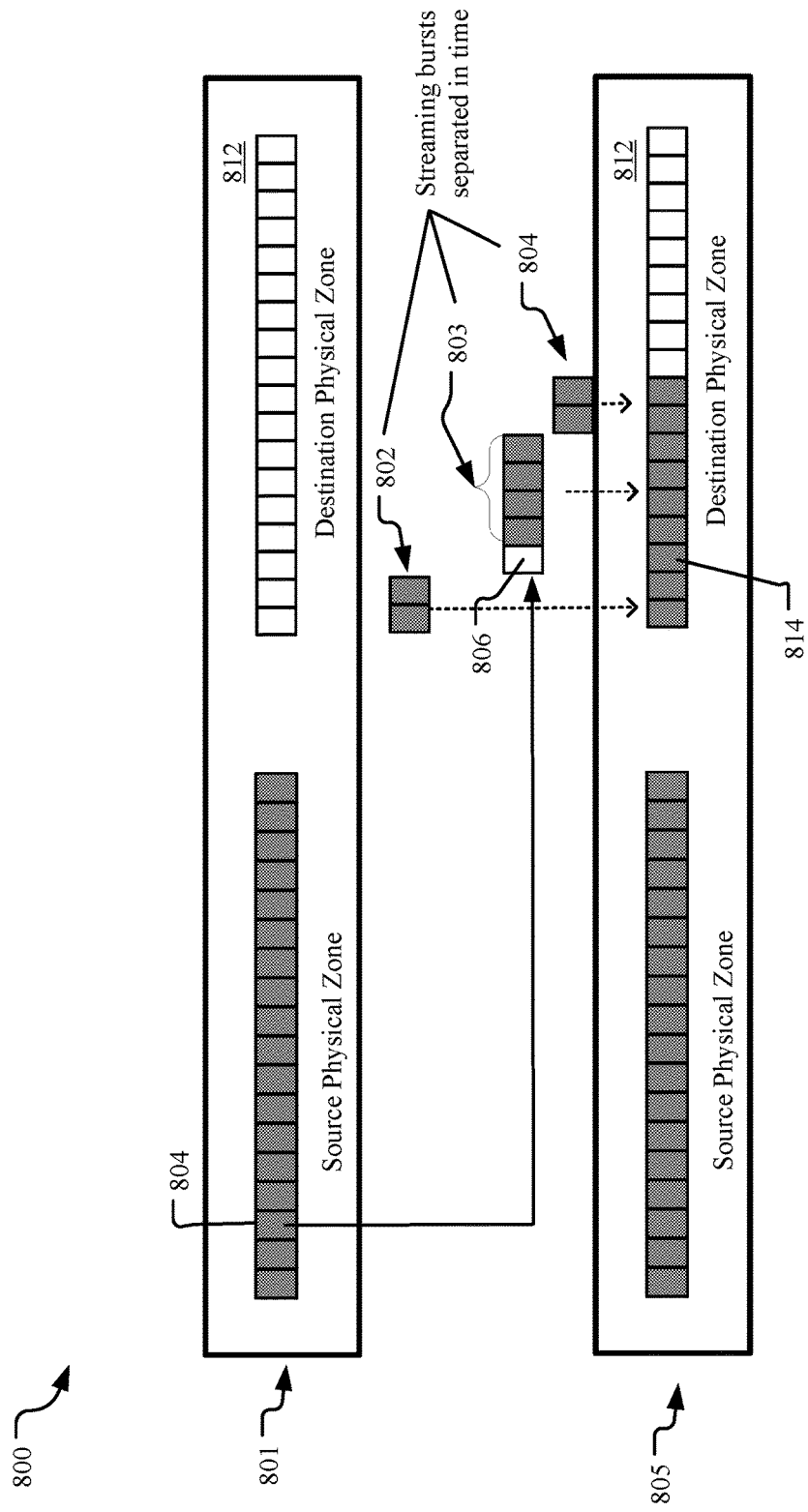
FIG. 8 illustrates another data management system implementing yet another zone-forwarding technique for sequential write handling.

FIG. 8 illustrates another data management system 800 implementing yet another zone-forwarding technique for sequential write handling. The data management system 800 includes a storage medium 812 with storage space divided into a number of physical zones including a Source Physical Zone and a Destination Physical Zone. A controller of the storage device (not shown) manages a mapping of various host logical zones to physical zones on the storage medium 812. In one implementation, the data management system 800 is a shingled magnetic recording system and the source Physical Zone and Destination Physical Zone are bands of shingled data tracks.

In the example of FIG. 8, all data tracks of the Source Physical Zone store data when the data management system 800 receives a series of sequential commands to write data segments 802, 803, and 804. The data segments 802, 803, and 804 are directed to various LBAs within a middle region of the Source Physical Zone. Unlike the example of FIG. 7, LBA ranges corresponding to the data segments 802, 803, and 804 are not entirely consecutive. Rather, there exists a gap in an LBA range between the requested data write 802 and the requested data write 803 (e.g., as indicated by a placeholder 806).

Responsive to receiving the write commands, the data management system 800 determines that it may not update any central data tracks of the Source Physical Zone without affecting some data that is not modified by the requested data writes. Consequently, the data management system 800 identifies another available (e.g., empty) physical zone—the "Destination Physical Zone"—and duplicatively maps the LBA's of the Host Zone to PBAs of Destination Physical Zone.

To fill the gap between the data segment 802 and the data segment 803, the data storage device 800 reads missing block(s) from a data track 804 of data from the Source Physical Zone (via a read operation 801) and attaches those block(s) to the data segment 803 so that a first portion of the Destination Physical Zone can be written to consecutively, in a sequential write order without any gaps, as illustrated by a write operation 805. Thus, after the write, a data track 814 includes the data originally stored in the data track 804.

To subsequently complete the in-process host zone that is duplicatively mapped to both the Source Physical Zone and the Destination Physical zone, the data management system 800 may, for example, use the copy-forward write technique discussed with respect to FIG. 4. For example, the data management system 800 may sequentially migrate remaining valid data from the latter portion of the Source Physical Zone to corresponding tracks of the Destination Physical Zone.

Figure 9:
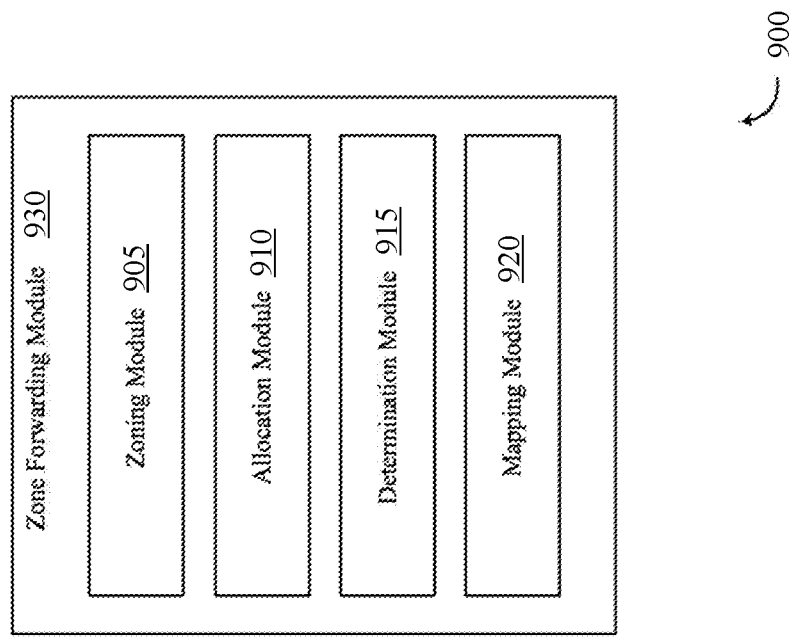
FIG. 9 shows a block diagram of an example zone forwarding module.

FIG. 9 shows a block diagram 900 of an example zone forwarding module 930. In one implementation, the zone forwarding module 930 is stored in a memory (not shown), and executable by a processor of a storage device. The zone forwarding module 930 includes zoning module 905, allocation module 910, determination module 915, and a mapping module 920. Each of these components may be in communication with each other.

In one embodiment, zoning module 905 divides storage space of the data storage device into multiple physical zones. In one implementation, the multiple physical zones are shingled bands of data in a shingled magnetic recording system. In another implementation, the physical zones represent groupings of consecutive data tracks in a storage system that does not utilize shingled magnetic recording. In still other implementations, the physical zones are defined by a granularity smaller or greater than a data track.

The storage space on the data storage device may be distributed between any combination of hard disk drives, solid state drives, and/or random-access memory (RAM) drives. In some cases, each zone is equal-sized. In other cases, the size of at least one zone varies from the size of another zone.

In one embodiment, allocation module 910 receives incoming data. The data may be generated by a computing device such as a client device and/or a server. In one embodiment, the data is sent from a client and received by the storage server, in conjunction with the allocation module 910. Additionally, or alternatively, the data may be generated by a client device and sent by the client device to a local storage device of the client and/or an external storage device associated with the server.

The allocation module 910 allocates ranges of host logical block address (LBAs) to the physical zones created by the zoning module 905. In some embodiments, mapping module 920 may map a range of host LBAs (e.g., a logical zone) to a physical zone created by the zoning module 905. In some cases, the mapping module 920 may map two or more physical zones to a single range of LBAs.

When the zone forwarding module 930 receives a request to write data, the allocation module 910 may map LBA(s) of the data to a first track of a first physical zone. In one embodiment, a determination module 915 determines whether writing the received data to the first track in the first physical zone affects data not modified by the requested data write, such as data recorded in a second adjacent track of the first physical zone. If, for example, valid data is already written to the track adjacent to the first track, then determination module 915 may determine that writing the received data to the first track affects data not modified by the requested data write. Responsive to such determination, the determination module 915 may determine whether there exists an available second physical zone of the multiple zones to receive the data originally directed to the first track of the first physical zone. In some cases, determination module 915 may query a table (e.g., free list 120 of FIG. 1) in determining whether a second zone is available.

In some embodiments, determination module 915 may determine where valid data exists within a physical zone (e.g., the first physical zone or the second physical zone) based on a high LBA and low LBA marker associated with a range of valid data in each physical zone. When no valid data is written to a physical zone, then the physical zone may have a high LBA marker that equals a low LBA marker. When valid data is written to a physical zone zone, then the high LBA marker may be updated to reflect the end location of this valid data. Accordingly, determining whether a physical zone includes valid data may entail determining whether a high LBA equals a low LBA of the zone. If the high LBA equals the low LBA, the determination module 915 may determine that the second zone does not contain valid data.

Upon identifying a second physical zone that is available (e.g., does not contain valid data), the mapping module 920 may map the second physical zone to the logical zone. Thus, both the first physical zone and second physical zone may be mapped to the same logical zone. In some embodiments, more than two physical zones may be mapped to a same logical zone. For example, a portion of a first physical zone may be mapped to a portion of the logical zone, a portion of a second physical zone may be mapped to another portion of the logical zone, and so forth.

In some embodiments, allocation module 910 may write a copy of data already recorded in the first physical zone and a copy of the received data (directed to the first track of the first physical zone) to a track of the second physical zone. For example, the allocation module 910 may combine the data already recorded in a target track of the first physical zone with the received data into a single segment of data and write the single segment of data to the second physical zone. In some embodiments, the allocation module 910 may combine the already recorded data with the received data in memory. Thus, the combined data may be temporarily stored in memory. The allocation module 910 may write the combined data from memory to the second physical zone.

In some embodiments, the allocation module 910 stores the received data in a non-volatile media cache of the data storage device, such as a flash memory. Thus, if power is cut while the allocation module 910 is combining and/or writing the combined data (e.g., the received data and some data previously recorded) to the second physical zone, the original data is not lost, as the recorded data is still stored in the first physical zone and the received data is still stored in the non-volatile media cache. Once power is restored, the allocation module 910 may once again combine, in memory, the previously-recorded data with the received data, and write the combined data to the second physical zone. In some embodiments, upon writing a copy of previously-recorded data to the second physical zone, the allocation module 910 may deallocate the previously-recorded data from the the first physical zone. Additionally, or alternatively, the allocation module 910 may deallocate the received data from the non-volatile media cache.

In one embodiment, mapping module 920 records a mapping of the data that has been recorded in the first physical zone (e.g., zone map 125 of FIGS. 1). The recorded mapping may include a pointer between the recorded data's original location and its new location. Thus, the mapping module 920 may log the recorded data's original location (e.g., second track of the first zone) and log the recorded data's new location (e.g., a track of the second zone). Additionally or alternatively, the recorded mapping may include a pointer between the received data's originally assigned location and its new location. Thus, mapping module 920 may log the received data's originally assigned location (e.g., first track of the first physical zone zone) and log the received data's new location (e.g., a track of the second physical zone). In some embodiments, the recorded mapping may enable the mapping module 920 to translate an access request for data at its original location to the data's new remapped location.

In some embodiments, the allocation module 910 may receive data and assign the data to a physical zone that does not contain any valid data. For example, the data storage device may be a new storage device, meaning data has not yet been written to the data storage device. Additionally or alternatively, the data in the first zone may be trimmed, so that valid data no longer exists in that physical zone. A trim command (e.g., TRIM) allows an operating system to inform a storage drive that certain blocks of data are no longer considered in use and can be removed. Thus, in one embodiment, determination module 915 may determine whether the first physical zone contains valid data. As described above, upon determining the first physical zone contains valid data, the allocation module 910 may store the received data in a media cache of the data storage device before recording the received data to a physical zone. In contrast, upon determining the first physical zone does not contain valid data, allocation module 910 may store the received data directly to the first physical zone, bypassing the media cache. In some cases, the allocation module 910 may write the received data directly to the first physical zone instead of storing the data to the media cache and then copying the received data from the media cache to the first physical zone in the user data space.

Figure 10:
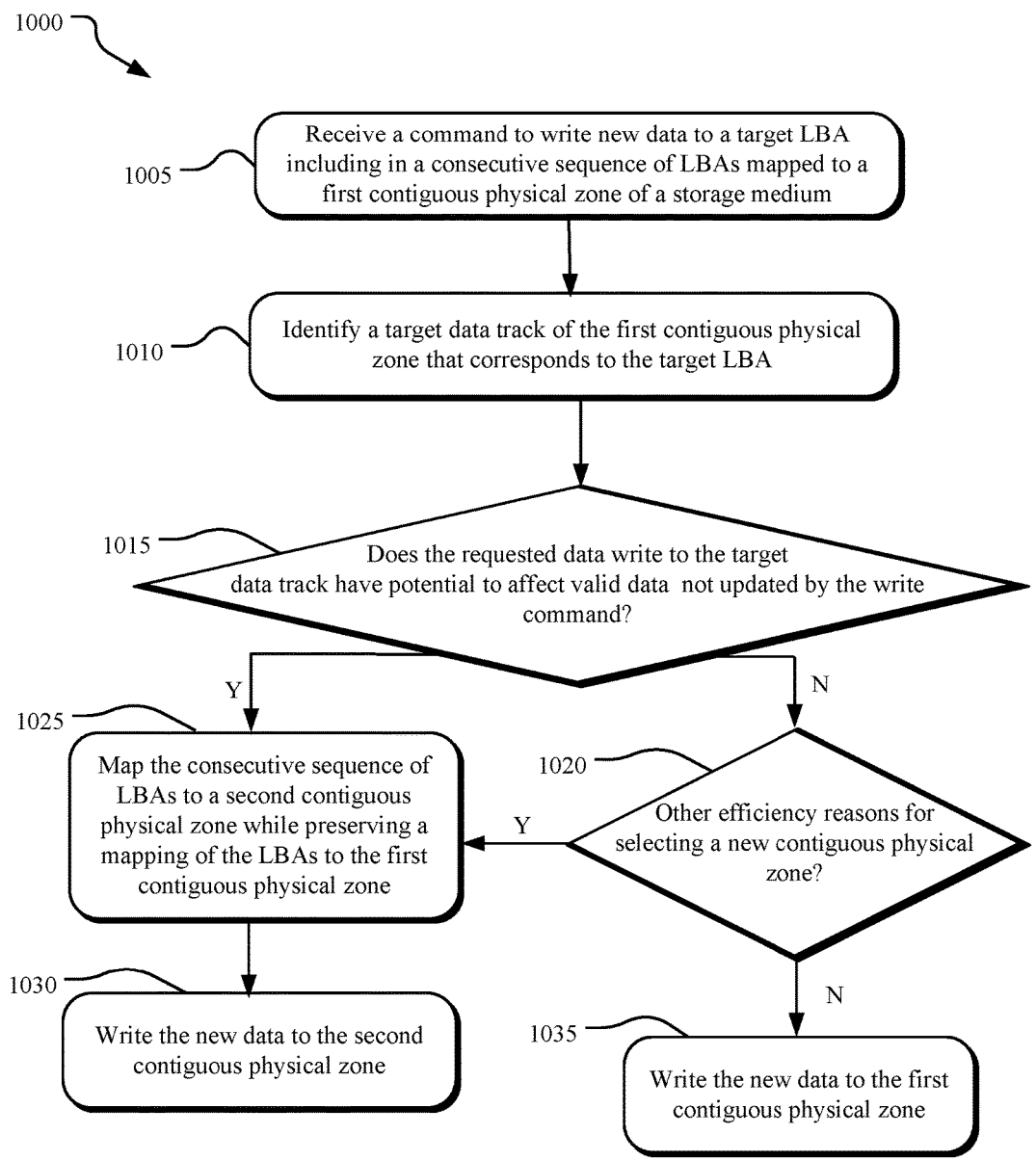
FIG. 10 is a flow chart illustrating example operations for zone forwarding drive management in an overprovisioned storage device.

FIG. 10 is a flow chart illustrating example operations 1000 for zone forwarding drive management in an overprovisioned storage device, in accordance with various aspects of the present disclosure. A receiving operation 1005 receives a command to write new data to a target LBA included within a consecutive sequence of LBAs mapped to a first contiguous physical zone of a storage medium. In one implementation, the first contiguous physical zone includes a number of consecutive data tracks. The first contiguous physical region may be identified in a variety of ways, such as by accessing a zone map (e.g., zone map 125 described with respect to FIG. 1). An identification operation 1010 identifies a target data track of the first contiguous physical zone that includes a physical block corresponding, in memory, to the target LBA.

A determining operation 1015 determines whether writing the new data to the target data track has the potential to affect (e.g., overwrite or corrupt) valid data that is not updated by the write command. For example, the determining operation 1015 may identify storage locations of valid data by accessing metadata associated with the first contiguous physical zone. In one implementation, metadata includes a low LBA marker and a high LBA marker in association with each of a number of contiguous physical zones, each pair of markers indicating a range of valid data stored in the associated physical zone.

The determination of whether a write of the new data has the potential to affect the valid data unmodified by the write depends on a select data management scheme (e.g., shingled magnetic recording, interlaced magnetic record, etc.) and may vary from one implementation to another. In one implementation, the first contiguous physical zone is a band of shingled data in a shingled magnetic storage system. Accordingly, the data write has the potential to affect other valid data when there exists valid data stored on a second track adjacent to the target data track.

If the determining operation 1015 determines that writing the new data to the target data track does not affect other data in the first contiguous physical zone unmodified by the write, another determination operation 1020 determines whether any conditions are satisfied indicating that processing efficiency may be improved by writing the new data to another contiguous physical zone anyway. If, for example, the target data track is several tracks apart from the nearest valid data in the first contiguous physical zone, additional processing overhead may be incurred to zero-fill spaces between the valid data and the new data if written to a target data track. This may be the case, for example, if the storage device keeps track of valid data storage locations using single-range H/L marks, as described elsewhere herein. If the determination operation 1020 determines that processing efficiency is not likely to be improved by writing the new data to another contiguous physical region, a writing operation 1035 writes the new data to the target data track in the first contiguous physical zone. In some implementations, the writing operation 1035 writes the new data directly to the first contiguous physical region, bypassing a non-volatile media cache.

If either (1) the determining operation 1015 determines that writing the new data to the target data track does affect other data unmodified by the write or (2) the determining operation 1020 determines that processing efficiency could be improved by writing the new data to a new contiguous physical zone, a mapping operation 1025 maps the consecutive sequence of LBAs to a second contiguous physical zone while preserving a mapping of the consecutive sequence of LBAs to the first contiguous zone For example, the preserved mapping may be one-to-one mapping indicating an association between each LBA of the consecutive sequence of LBAs and a corresponding PBA in the first physical zone. The mapping operation 1025 may, in some implementations, entail updating metadata relating to a mapping of the consecutive sequence of LBAs to the first contiguous physical zone. For example, metadata may be updated to indicate that the target data track no longer stores valid data.

As used herein, the language "preserving the mapping" does not bear weight on the validity of data identified by a mapping. Therefore, a mapping between LBAs and a physical zone may be "preserved" even when metadata of the physical zone changes, such as metadata indicating whether the data in the zone is currently valid or invalid.

In one implementation, the first contiguous physical zone and the second contiguous physical zone are equally-sized shingled data bands in a shingled magnetic recording system. A write operation 1030 writes the new data to a select data track in the second contiguous physical zone. In one implementation, the select data track assumes a same physical index within the second contiguous physical zone as the target data track assumes in the first contiguous physical zone. For example, the target data track and the select data track are both the third track in the associated physical zones.

In one implementation, the write operation 1030 further comprises merging the new data with a subset of data recorded in the first contiguous physical zone. For example, the new data is merged with other data of the target data track unmodified by execution of the write command. In this case, the updated version of the target data track may be written to the second contiguous physical zone (e.g., as shown in merge operation 302 of FIG. 3A). In other implementations, the new data is merged with other data of the target data track in addition to previously-recorded data from one or more data tracks that precede target data track in a consecutive indexing scheme of the first contiguous physical zone (e.g., as shown in merge operation 402 of FIG. 4).

In still other implementations, the write operation 1030 entails zero-filling a range of data blocks of the second contiguous physical zone. For example, the new data may be merged with recorded data and one or more 'zero' placeholder bits indicating free space, and the merged data is then written to the second contiguous physical zone.

In some implementations, the new data is written to a non-volatile media cache prior to the write operation 1030 to ensure that no data is lost in the event of power failure during the write operation 1030. In still other operations, the write operation 1030 entails copying an additional subset of valid data from the first contiguous physical region to the second contiguous physical region. For example, the additional subset may include data of LBAs following the target LBA in the consecutive range of LBAs while excluding data of LBAs preceding the target LBA in the consecutive range of LBAs.

In some implementations, the operations 1000 may include additional operations for migrating all valid data of the consecutive sequence of LBAs to a common contiguous physical zone. If, for example, one or more writes are performed to migrate the valid data of the consecutive sequence of LBAs back the the first physical zone, the second physical zone can be freed from association with (e.g., deallocated from) the consecutive sequence of LBAs.

Figure 11:
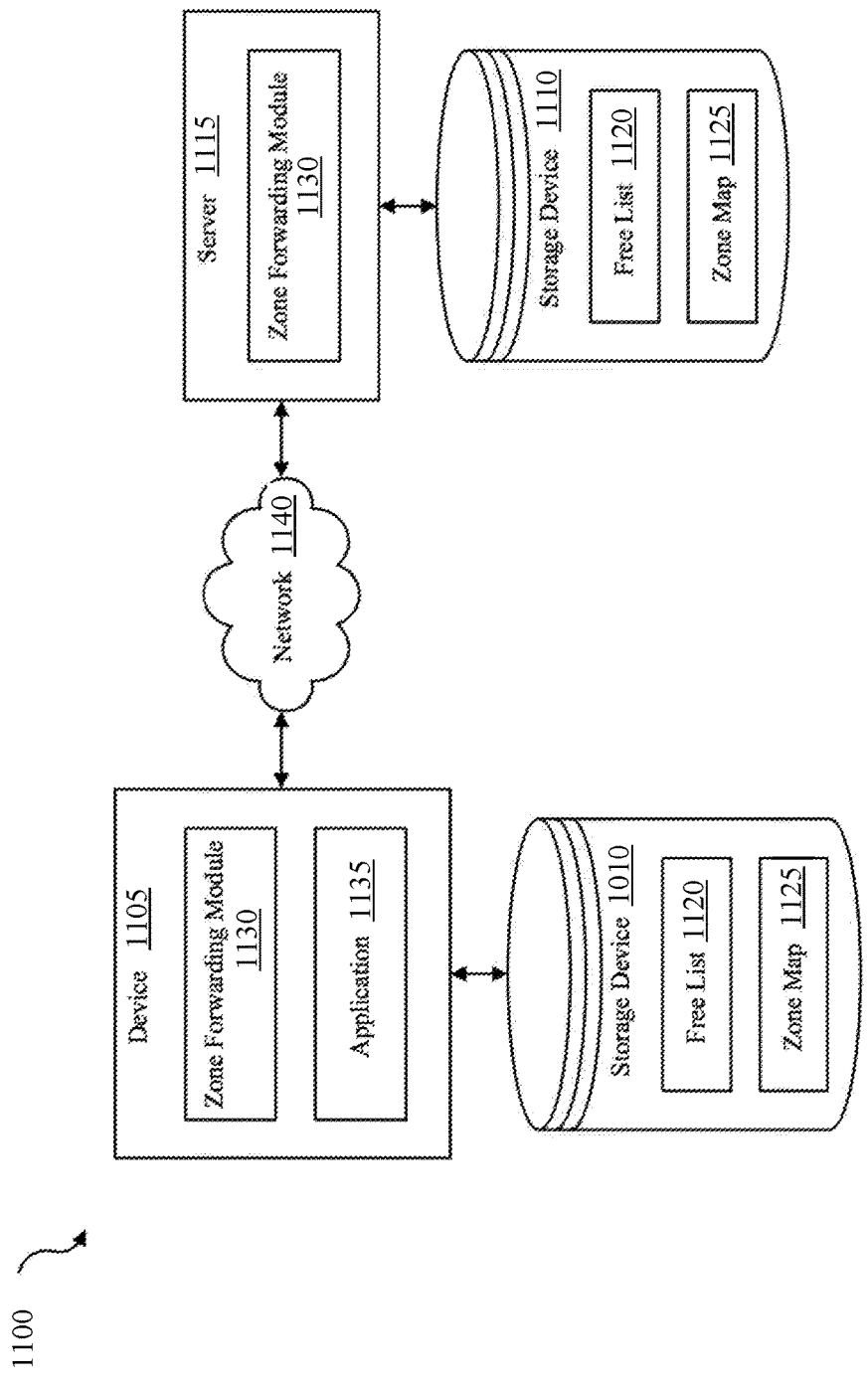
FIG. 11 shows an example system for zone forwarding drive management.

FIG. 11 is a block diagram illustrating another embodiment of an environment 1100 in which the present systems and methods may be implemented. As depicted, environment 1100 may include device 1105, storage device 1110, network 1140, server 1115, and storage device 1110. Device 1105 may be one example of the device 105 illustrated in FIG. 1.

In some embodiments, device 1105 may communicate with server 1115 via a network 1140. Example of networks 1140 include, local area networks (LAN), wide area networks (WAN), virtual private networks (VPN), wireless networks (using 1102.11, for example), cellular networks (using 3G and/or LTE, for example), etc. A zone-forwarding module 1130 may be located on the device 1105 or on the server 1115. In some embodiments, device 1105 may include an application 1135 that allows the device 1105 to interface with the zone forwarding module 1130 located on server 1115. In some embodiments, at least a portion of the functions of the zone forwarding module 1130 are performed separately and/or concurrently on both the device 1105 and the server 1115.

Examples of server 1115 include storage server, data server, storage controller, storage enclosure, etc. In some embodiments, the server 1115 may include the zone forwarding module 1130 and may be coupled to the storage device 1110. For example, the zone forwarding module 1130 may access free list 1120 and/or zone map 1125 in the storage device 1110 via network 1140 and server 1115. In some cases, server 1115 may access free list 1120 and/or zone map 1125 in the storage device 1110 via network 1140 and device 1105.

Figure 12:
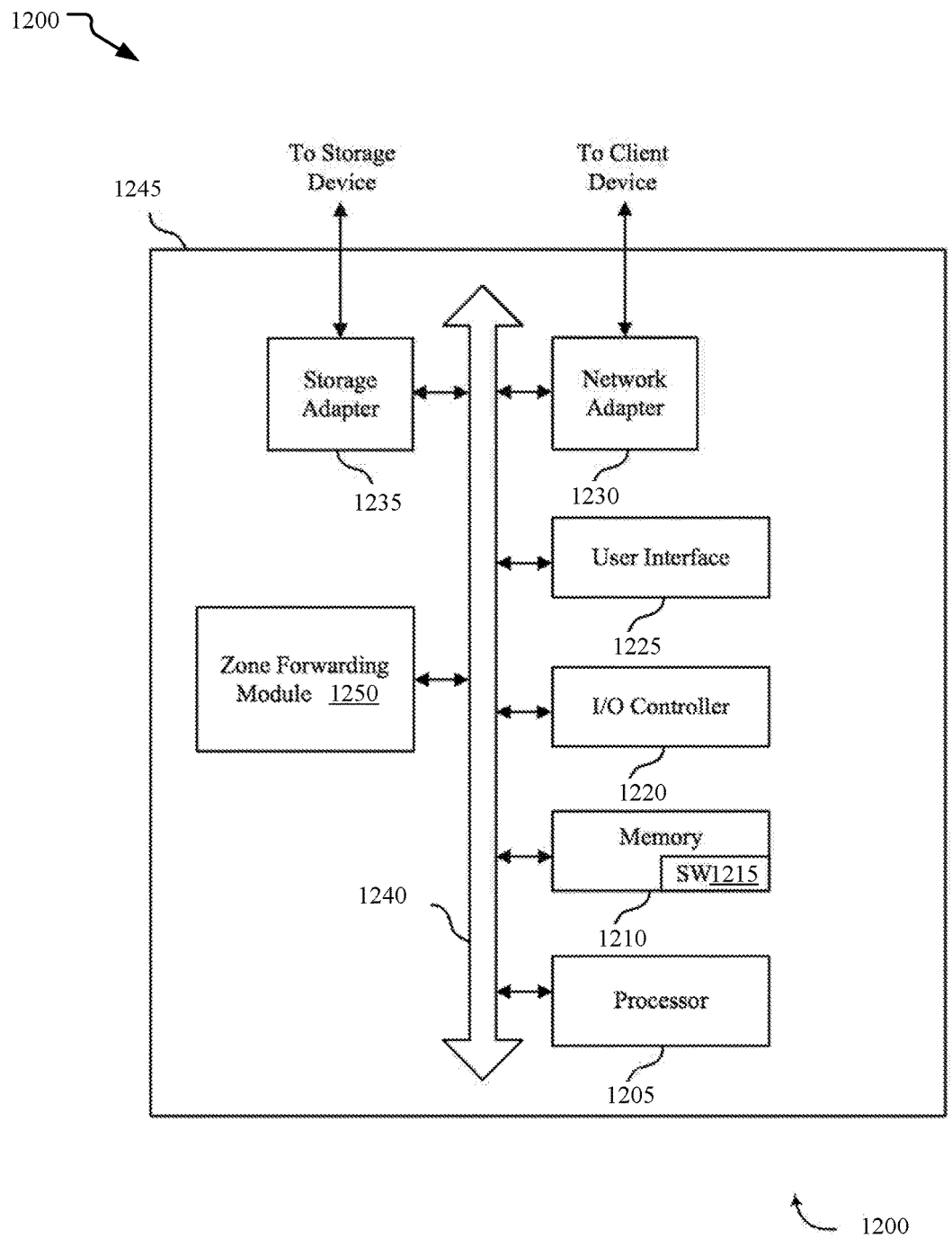
FIG. 12 is a block diagram illustrating an example environment in which the present systems and methods may be implemented.

FIG. 12 shows a system 1200 for zone forwarding drive management, in accordance with various examples. System 1200 may include an apparatus 1245, which may be an example of any one of devices 105, 110 of FIG. 1.

Apparatus 1245 may include components for bi-directional voice and data communications including components for transmitting communications and components for receiving communications. For example, apparatus 1245 may communicate bi-directionally with one or more storage devices and/or client systems. This bi-directional communication may be direct (e.g., apparatus 1245 communicating directly with a storage system) and/or indirect (e.g., apparatus 1245 communicating indirectly with a client device through a server).

Apparatus 1245 may also include a processor module 1205, and memory 1210 (including software/firmware code (SW) 1215), an input/output controller module 1220, a user interface module 1225, a network adapter 1230, and a storage adapter 1235. The software/firmware code 1215 may be one example of a software application executing on apparatus 1245. The network adapter 1230 may communicate bi-directionally—via one or more wired links and/or wireless links—with one or more networks and/or client devices. In some embodiments, network adapter 1230 may provide a direct connection to a client device via a direct network link to the Internet via a POP (point of presence). In some embodiments, network adapter 1230 of apparatus 1245 may provide a connection using wireless techniques, including digital cellular telephone connection, Cellular Digital Packet Data (CDPD) connection, digital satellite data connection, and/or another connection. The apparatus 1245 may include a zone forwarding module 1250, which may perform the functions described above for the zone forwarding modules described elsewhere herein.

The signals associated with system 1200 may include wireless communication signals such as radio frequency, electromagnetics, local area network (LAN), wide area network (WAN), virtual private network (VPN), wireless network (using 1202.11, for example), cellular network (using 3G and/or LTE, for example), and/or other signals. The network adapter 1230 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 1240 may allow data communication between one or more elements of apparatus 1245 (e.g., processor module 1205, memory 1210, I/O controller module 1220, user interface module 1225, network adapter 1230, and storage adapter 1235, etc.).

The memory 1210 may include random access memory (RAM), read only memory (ROM), flash RAM, and/or other types. The memory 1210 may store computer-readable, computer-executable software/firmware code 1215 including instructions that, when executed, cause the processor module 1205 to perform various functions described in this disclosure. Alternatively, the software/firmware code 1215 may not be directly executable by the processor module 1205 but may cause a computer (e.g., when compiled and executed) to perform functions described herein. Alternatively, the computer-readable, computer-executable software/firmware code 1215 may not be directly executable by the processor module 1205, but may be configured to cause a computer (e.g., when compiled and executed) to perform functions described herein. The processor module 1205 may include an intelligent hardware device, e.g., a central processing unit (CPU), a microcontroller, an application-specific integrated circuit (ASIC), etc.

In some embodiments, the memory 1210 may contain, among other things, the Basic Input-Output system (BIOS) which may control basic hardware and/or software operation such as the interaction with peripheral components or devices. For example, the zone forwarding module 1250 to implement the present systems and methods may be stored within the system memory 1210. Applications resident with system 1200 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 1230, etc.).

Many other devices and/or subsystems may be connected to one or may be included as one or more elements of system 1200 (e.g., personal computing device, mobile computing device, smart phone, server, internet-connected device, cell radio module, and so on). In some embodiments, all of the elements shown in FIG. 12 need not be present to practice the present systems and methods. The devices and subsystems can be interconnected in different ways from that shown in FIG. 12. In some embodiments, an aspect of some operation of a system, such as that shown in FIG. 12, may be readily known in the art and are not discussed in detail in this application. Code to implement the present disclosure can be stored in a non-transitory computer-readable medium such as one or more of system memory 1210 or other memory. The operating system provided on I/O controller module 1220 may be iOS®, ANDROID®, MS-DOS®, MS-WINDOWS®, OS/2®, UNIX®, LINUX®, or another known operating system.

The I/O controller module 1220 may operate in conjunction with network adapter 1230 and/or storage adapter 1235. The network adapter 1230 may enable apparatus 1245 with the ability to communicate with client devices (e.g., device 105 of FIG. 1), and/or other devices over the network 1140 of FIG. 11. Network adapter 1230 may provide wired and/or wireless network connections. In some cases, network adapter 1230 may include an Ethernet adapter or Fibre Channel adapter. Storage adapter 1235 may enable apparatus 1245 to access one or more data storage devices (e.g., storage device 110). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a tangible computer-readable medium. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

This disclosure may specifically apply to storage system applications. In some embodiments, the concepts, the technical descriptions, the features, the methods, the ideas, and/or the descriptions may specifically apply to distributed storage systems and/or cloud storage applications. Distinct advantages of such systems for these specific applications are apparent from this disclosure.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for managing a storage device, comprising:
receiving a command to write new data to a target LBA included in a consecutive sequence of LBAs mapped to a first contiguous physical zone of a storage medium;
determining that writing the new data to the first contiguous physical zone affects valid data in one or more blocks of the first contiguous physical zone not updated by the command;
based on the determination, mapping the consecutive sequence of LBAs to a second contiguous physical zone while preserving the mapping of the LBAs to the first contiguous physical zone; and
writing the new data to the second contiguous physical zone.

2. The method of claim 1, wherein writing the new data to the second contiguous physical zone further comprises:
copying a subset of valid data from the first contiguous physical zone to the second contiguous physical zone, wherein the subset includes data of LBAs following the target LBA in the consecutive range of LBAs and the subset excludes data of LBAs preceding the target LBA in the consecutive range of LBAs.

3. The method of claim 2, wherein copying the subset of valid data further comprises:
copying multiple subsets of valid data to the second contiguous physical zone in multiple separate write operations, wherein the subsets are written to the second contiguous physical zone according to a consecutive track order.

4. The method of claim 3, wherein the copying of multiple subsets of valid data begins with a subset of data located in a middle region of the first contiguous physical zone.

5. The method of claim 1, wherein the first contiguous physical zone and the second contiguous physical zone are separate bands of shingled data in a shingled magnetic recording system.

6. The method of claim 5, wherein writing the data further comprises:
zero-filling placeholder bits into one or more gaps between the two or more LBA subsets.

7. The method of claim 1, further comprising:
receiving sequential write commands to modify data of two or more LBA subsets within the sequential sequence of LBAs; and
writing the data of the two or more LBA subsets to corresponding blocks within the second contiguous physical zone according to a consecutive LBA order.

8. The method of claim 7, further comprising:
determining that the first contiguous zone includes valid data corresponding to an LBA gap between the two or more LBA subsets; and
writing in the second contiguous zone, according to the consecutive LBA order, the data of the two or more LBA subsets and the valid data corresponding to the LBA gap.

9. The method of claim 1, wherein the data write to the second contiguous physical zone is smaller in size than a size of data currently stored in the first contiguous physical zone.

10. The method of claim 1, further comprising:
receiving another command to write additional data to a second LBA of the consecutive sequence of LBAs;
writing the additional data to the second contiguous physical zone; and
zero-filling a range of data blocks in the second contiguous physical zone between physical blocks mapped to the target LBA and the second LBA.

11. The method of claim 1, further comprising:
mapping the consecutive sequence of LBAs to a third contiguous physical zone while preserving the mapping of the LBAs to the first contiguous physical zone and the second contiguous physical zone.

12. One or more tangible computer-readable storage media encoding computer-executable instructions for executing on a computer system a computer process, the computer process comprising:
receiving a command to write new data to a target LBA included in a consecutive sequence of LBAs mapped to a first contiguous physical zone of a storage medium;
determining that writing the new data to the first contiguous physical zone affects valid data in one or more blocks of the first contiguous physical zone not updated by the command;
based on the determination, mapping the consecutive sequence of LBAs to a second contiguous physical zone while preserving the mapping of the LBAs to the first contiguous physical zone; and
writing the new data to the second contiguous physical zone.

13. The one or more tangible computer-readable storage media of claim 12, wherein the computer process further comprises:
copying a subset of valid data from the first contiguous physical zone to the second contiguous physical zone, wherein the subset includes data of LBAs following the target LBA in the consecutive sequence of LBAs and the subset excludes data of LBAs preceding the target LBA in the consecutive sequence of LBAs.

14. The one or more tangible computer-readable storage media of claim 12, wherein copying the subset of valid data further comprises:
copying multiple subsets of valid data to the second contiguous physical zone in multiple separate write operations, wherein the subsets are written to the second contiguous physical zone according to a consecutive track order.

15. The one or more tangible computer-readable storage media of claim 12, wherein the first contiguous physical zone and the second contiguous physical zone are separate bands of shingled data in a shingled magnetic recording system.

16. The one or more tangible computer-readable storage media of claim 12, wherein the computer process further comprises:
migrating valid data of the first contiguous physical zone to the second contiguous physical zone and freeing the first contiguous physical zone from association with the consecutive sequence of LBAs.

17. A system comprising:
memory;
at least one processor;
a zone forwarding module stored in the memory and executable by the at least one processor, the zone forwarding module configured to:
receive a command to write new data to a target LBA included in a consecutive sequence of LBAs mapped to a first contiguous physical zone of a storage medium;
map the consecutive sequence of LBAs to a second contiguous physical zone while preserving the mapping of the LBAs to the first contiguous physical zone responsive to a determination that the command affects valid data in one or more blocks of the first contiguous physical zone not updated by the command; and write the new data to the second contiguous physical zone.

18. The system of claim 17, wherein the first contiguous physical zone and second contiguous physical zone are zones on an overprovisioned storage drive.

19. The system of claim 17, wherein the zone forwarding module is further configured to migrate valid data of the second contiguous physical zone back to the first contiguous physical zone and free the second contiguous physical zone from association with the consecutive sequence of LBAs.

20. The system of claim 17, wherein the one forwarding module is further configured to migrate valid data of the first contiguous physical zone to the second contiguous physical zone and free the first contiguous physical zone from association with the consecutive sequence of LBAs.

* * * * *